United States Patent
Yang

(10) Patent No.: US 9,983,450 B2
(45) Date of Patent: May 29, 2018

(54) GOA CIRCUIT MODULE, METHOD FOR TESTING THE SAME, DISPLAY PANEL AND DISPLAY APPARATUS

(71) Applicants: BOE Technology Group Co., Ltd., Beijing (CN); Hefei BOE Optoelectronics Technology Co., Ltd., Anhui (CN)

(72) Inventor: Huaiwei Yang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 0 days. days.

(21) Appl. No.: 15/124,462

(22) PCT Filed: May 13, 2015

(86) PCT No.: PCT/CN2015/078841
§ 371 (c)(1),
(2) Date: Sep. 8, 2016

(87) PCT Pub. No.: WO2016/101498
PCT Pub. Date: Jun. 30, 2016

(65) Prior Publication Data
US 2017/0017130 A1    Jan. 19, 2017

(30) Foreign Application Priority Data
Dec. 24, 2014  (CN) .......................... 2014 1 0817878

(51) Int. Cl.
*G02F 1/1362* (2006.01)
*G02F 1/1368* (2006.01)
(Continued)

(52) U.S. Cl.
CPC ...... *G02F 1/136259* (2013.01); *G02F 1/1309* (2013.01); *G02F 1/1368* (2013.01);
(Continued)

(58) Field of Classification Search
None
See application file for complete search history.

(56) References Cited

U.S. PATENT DOCUMENTS 9,196,640 B2 * 11/2015 Xu ....................... H01L 27/1259
9,263,387 B2 *  2/2016 Yan ..................... H01L 27/0288
(Continued)

FOREIGN PATENT DOCUMENTS

| CN | 103022031 A | 4/2013 |
|---|---|---|
| CN | 103413812 A | 11/2013 |
| CN | 103456744 A | 12/2013 |
| CN | 104503174 A | 4/2015 |
| JP | 2001-75126 A | 3/2001 |

OTHER PUBLICATIONS

International Search Report and Written Opinion, including English translation of Box No. V of the Written Opinion, for International Application No. PCT/CN2015/078841, dated Sep. 8, 2015, 8 pages.

*Primary Examiner* — Jermele M Hollington
(74) *Attorney, Agent, or Firm* — Westman, Champlin & Koehler, P.A.

(57) ABSTRACT

The present disclosure provides a Gate On Array (GOA) circuit module, comprising: a plurality of Thin Film Transistors (TFTs), each comprising a gate layer and a gate insulation layer laminated on a substrate, a plurality of vias each provided in the gate insulation layer to expose a portion of the gate layer, and a plurality of first transparent conductive portions each corresponding to one of the plurality of vias, each of the plurality of the first transparent conductive portions being provided at its corresponding via, electrically isolated from the gate layer, and constructed to be electrically connectable to the portion of the gate layer as exposed
(Continued)

by its corresponding via by means of welding. The present disclosure also provides a method for testing the GOA circuit module, a display panel comprising the GOA circuit module and a display apparatus.

17 Claims, 2 Drawing Sheets

(51) Int. Cl.
 *G02F 1/1333* (2006.01)
 *G02F 1/1345* (2006.01)
 *G02F 1/13* (2006.01)
(52) U.S. Cl.
 CPC ...... *G02F 1/13454* (2013.01); *G02F 1/13458* (2013.01); *G02F 1/133345* (2013.01); *G02F 1/136286* (2013.01); *G02F 2001/136254* (2013.01)

(56) References Cited

U.S. PATENT DOCUMENTS

| | | | |
|---|---|---|---|
| 9,613,986 B2* | 4/2017 | Li | H01L 29/78642 |
| 9,659,978 B2* | 5/2017 | Xu | H01L 27/1259 |
| 9,721,978 B2* | 8/2017 | Wang | H01L 27/1288 |
| 2012/0099043 A1* | 4/2012 | Sun | H01L 29/41733 |
| | | | 349/43 |
| 2014/0175443 A1* | 6/2014 | Xie | H01L 27/1288 |
| | | | 257/59 |
| 2014/0187001 A1* | 7/2014 | Guo | H01L 29/66765 |
| | | | 438/158 |
| 2014/0340625 A1* | 11/2014 | Hsu | G02F 1/13454 |
| | | | 349/153 |
| 2016/0049424 A1* | 2/2016 | Zhang | H01L 27/124 |
| | | | 257/72 |
| 2016/0247821 A1 | 8/2016 | Li et al. | |

\* cited by examiner

GOA CIRCUIT MODULE, METHOD FOR TESTING THE SAME, DISPLAY PANEL AND DISPLAY APPARATUS

CROSS-REFERENCE TO RELATED APPLICATION

This Application is a Section 371 National Stage Application of International Application No. PCT/CN2015/078841, filed 13 May 2015 and published as WO 2016/101498 A1 on 30 Jun. 2016, in Chinese, the contents of which are hereby incorporated by reference in their entirety.

TECHNICAL FIELD

The present disclosure relates to a display technology, and more particularly, to a GOA circuit module for use in a display apparatus, a method for testing the GOA circuit module, a display panel including the GOA circuit module and a display apparatus.

BACKGROUND

Recently, displays have been evolving towards high-level integration and low cost. With the development of the Thin Film Transistor-Liquid Crystal Display (TFT-LCD) technology, especially due to increasingly higher requirements on narrow rims in small-size screens, the use of the Gate On Array (GOA) technique becomes more frequently. The GOA technique can integrate a gate switch driving circuit onto an array substrate of a display panel, such that a separate gate driving integrated circuit component can be omitted. In this way, the material cost and the manufacture cost of a display apparatus can be reduced and the rims of the panel can be narrowed, thereby providing panels in conformity to the trend of technical development.

During the production of a TFT-LCD, defects associated with a GOA circuit often occur in a display panel. In a parsing process, it is required to test characteristics of TFTs in the GOA circuit and/or output signals from the GOA circuit, so as to confirm the cause of the defect. However, due to the difference in mask designs for different display panels, in a parsing process for a display panel with a GOA circuit, it is typically difficult to test characteristics of individual TFTs within the GOA circuit and the output signals from the GOA circuit, and thus difficult to determine the location and cause of the defect. Furthermore, in order to test the output signals from the GOA circuit, it is conventionally required to pry a corner of a color filter substrate away before testing, which has a very low rate of success and may damage the GOA circuit of the display panel such that no more testing can be performed.

SUMMARY

It is an object of the present disclosure to overcome at least one of the above and other problems and drawbacks in the conventional solution.

In an aspect of the present disclosure, a GOA circuit module is provided. The GOA circuit module comprises: a plurality of Thin Film Transistors (TFTs), each comprising a gate layer and a gate insulation layer laminated on a substrate; a plurality of vias each provided in the gate insulation layer to expose a portion of the gate layer; and a plurality of first transparent conductive portions each corresponding to one of the plurality of vias. Each of the plurality of the first transparent conductive portions is provided at its corresponding via, electrically isolated from the gate layer, and constructed to be electrically connectable to the portion of the gate layer as exposed by its corresponding via by means of welding.

In the above GOA circuit module, each of the first transparent conductive portions can be made of an Indium Tin Oxide (ITO) material.

The above GOA circuit module can further comprise a passivation layer covering locations of the plurality of vias, such that each of the plurality of the first transparent conductive portions is electrically isolated from the gate layer by the passivation layer.

In the above GOA circuit module, each of the plurality of TFTs can further comprise a source/gate layer arranged between the gate layer and the passivation layer in areas where the plurality of vias are located.

The above GOA circuit module can further comprise a signal output lead and a first signal line. The first signal line intersects with and electrically isolated from the signal output lead. The first signal line is constructed to be electrically disconnectable from other portions of the GOA circuit module than the signal output lead and electrically connectable to the signal output lead by means of welding in an area where it intersects with the signal output lead.

Alternatively, according to another aspect of the present disclosure, a GOA circuit module is provided. The GOA circuit module comprises a signal output lead and a first signal line. The first signal line intersects with and electrically isolated from the signal output lead. The first signal line is constructed to be electrically disconnectable from other portions of the GOA circuit module than the signal output lead and electrically connectable to the signal output lead by means of welding in an area where it intersects with the signal output lead.

The above GOA circuit module can further comprise a second signal lead connected to a signal input lead of the GOA circuit module.

The above GOA circuit module can further comprise a testing pad having a first portion electrically connected to the first signal line and a second portion electrically connected to the second signal line, the first portion and the second portion being separated from each other.

In the above GOA circuit module, the first signal line can further be connected to the signal input lead of the GOA circuit module, and the first and second portions of the testing pad can be electrically connected to each other by a second transparent conductive portion that can be cut off.

In the above GOA circuit module, the second transparent conductive portion is made of an ITO material.

In the above GOA circuit module, the first signal line and/or the second signal line can comprise a source power line and/or a drain power line of at least one of the plurality of TFTs.

According to another aspect of the present disclosure, a display panel is provided. The display panel comprises an array substrate having the above GOA circuit module integrated thereon.

According to yet another aspect of the present disclosure, a display apparatus is provided. The display apparatus comprises the above display panel.

According to a further aspect of the present disclosure, a method for testing the above GOA circuit module is provided. The method comprises steps of: electrically connecting one of the plurality of the first transparent conductive portions to the portion of the gate layer as exposed by its corresponding via; inputting a gate control signal to the gate layer to which the first transparent conductive portion is electrically connected, through the first transparent conductive portion; and inputting a test signal to the TFT associated with the gate layer to which the first transparent conductive portion is electrically connected, and testing an output signal from the TFT to determine a characteristic of the TFT.

In the above method, the first transparent conductive portion can be electrically connected to the gate layer by means of laser welding.

The above method can further comprise steps of: electrically disconnecting the first signal line from the other portions of the GOA circuit module than the signal output lead; electrically connecting the first signal line to the signal outputting lead; and detecting an output signal from the GOA circuit module on the first signal line. It is to be noted here that these features are also applicable to the GOA circuit module provided with the first signal line but no first transparent conductive portion.

In the above method, the first signal line is electrically disconnected from the other portions of the GOA circuit module than the signal output lead by means of laser cut-off.

In the above method, the first signal line is electrically connected to the signal outputting lead by means of laser welding.

From the detailed description of the present disclosure given below with reference to the drawings, which facilitate comprehensive understanding of the present disclosure, the above and other objects and advantages of the present disclosure will become more apparent.

BRIEF DESCRIPTION OF THE DRAWINGS

The features and objects of the present disclosure will be understood more clearly with reference to the figures. The figures are illustrative only, rather than limiting the scope of the present disclosure, in which.

DETAILED DESCRIPTION OF THE EMBODIMENTS

In the following, the present application will be described in further detail with reference to the embodiments, taken in conjunction with the figures, such that the objects, solutions and advantages of the present disclosure will become more apparent.

Further, in the following detailed description, for the purpose of illustration, many details are provided to facilitate a comprehensive understanding of the embodiments according to the present disclosure. However, it can be appreciated that one or more of the embodiments can be implemented without these details. In other cases, well-known structures and devices are shown in a graphical form for simplifying the figures.

According to a general concept of the present disclosure, a GOA circuit module is provided. The GOA circuit module includes: a plurality of Thin Film Transistors (TFTs), each comprising a gate layer and a gate insulation layer laminated on a substrate; a plurality of vias each provided in the gate insulation layer to expose a portion of the gate layer; and a plurality of first transparent conductive portions each corresponding to one of the plurality of vias. Each of the plurality of the first transparent conductive portions is provided at its corresponding via, electrically isolated from the gate layer, and constructed to be electrically connectable to the portion of the gate layer as exposed by its corresponding via by means of welding. In this way, during a test, each first transparent conductive portion can be electrically connected to the portion of the gate layer as exposed by its corresponding via appropriately, such that the characteristics of the respective TFTs in the GOA circuit module can be tested.

Figure 1:
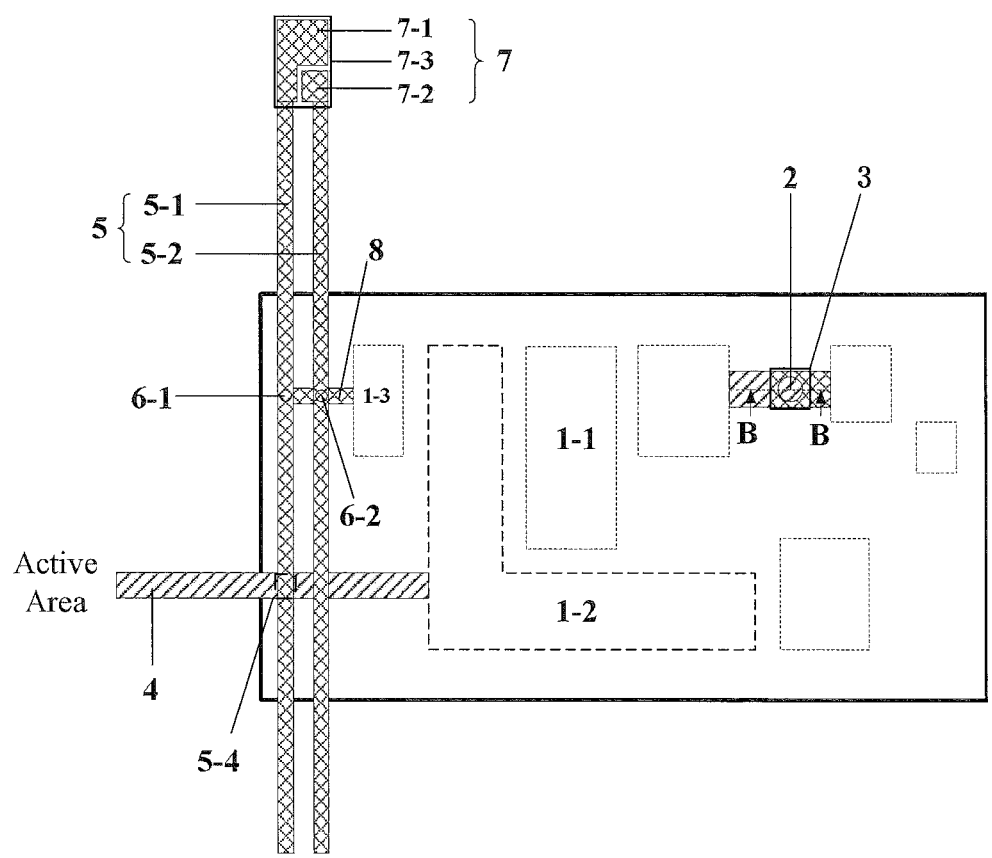
FIG. 1 is a schematic diagram showing a GOA circuit module according to an exemplary embodiment of the present disclosure.

FIG. 1 shows a GOA circuit module according to an exemplary embodiment, which can be used as a gate switch driving circuit in a display apparatus such as a TFT-LCD. As known by those skilled in the art, the GOA circuit module includes a multi-stage structure or shift register typically consisting of a plurality of TFTs (e.g., TFTs 1-1 and 1-2 as shown in FIG. 1). The structure or shift register at each stage has an output terminal connected to a corresponding gate line in the display panel, such that the display panel can be driven in a progressive scanning manner for displaying images. In FIG. 1, only the TFTs 1-1 and 1-2 are shown for the purpose of illustration. However, it can be appreciated that the structure and layout of all the TFTs in the GOA circuit module are not limited to the specific one shown in FIG. 1.

Figure 2:
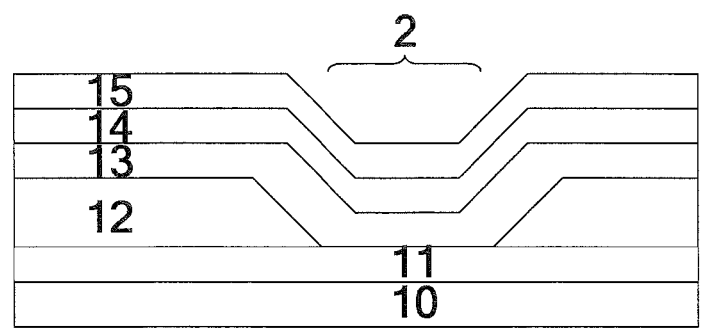
FIG. 2 is a section view of an exemplary structure taken along the line B-B from FIG. 1.
Figure 3:
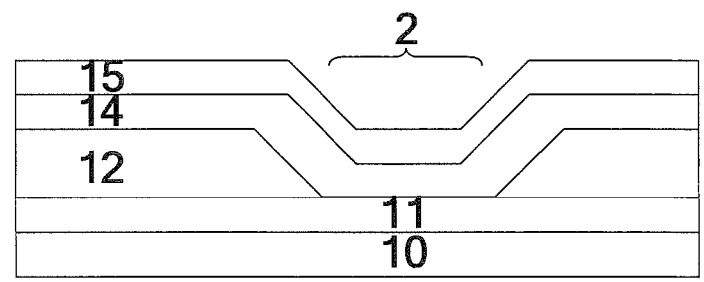
FIG. 3 is a section view of another exemplary structure taken along the line B-B from FIG. 1.

As can be appreciated by those skilled in the art and shown in FIGS. 2 and 3, a TFT is typically constructed with patterns for a gate layer 11, a gate insulation layer 12, an active layer (not shown) and a source/drain layer 13 provided on a substrate 10 in that order, by utilizing a semiconductor process such as deposition. Further, the TFT structure can be overlaid with a passivation or protection layer 14. In order to provide a gate outlet of the TFT, typically a via, or through hole, 2 can be provided in the gate insulation layer to expose a portion of the gate layer 11. The source/drain layer 13 and the passivation layer 14 are laminated in that order in the via 2 (as shown in FIG. 2). Alternatively, the source/drain layer 13 can be formed in the via 12 (as shown in FIG. 3).

According to another embodiment of the present disclosure, at least at each via 2, the passivation layer 14 is overlaid with a first transparent conductive portion 15, which is electrically isolated by the passivation layer 14 from the gate layer 11 as exposed by the via 2 and is constructed to be electrically connectable to the portion of the gate layer 11 as exposed by the via 2 appropriately (e.g., by means of welding). In an example, the first transparent conductive portion can be made of an Indium Tin Oxide (ITO) material or any other transparent conductive material. A mark 3 can be provided at a position on the first transparent conductive portion that corresponds to the via 2, so as to indicating the position of the via 2.

In this embodiment, in order to test the GOA circuit module, the first transparent conductive portion 15 is first electrically connected to the portion of the gate layer 11 exposed by the via 2, including melting the first transparent conductive portion 15, by means of laser welding, for contacting or welding with the portion of the gate layer 11 exposed by the via 2, e.g., by inserting a probe into the first transparent conductive portion. Then, a gate control signal is inputted to the gate layer to which the first transparent conductive portion is electrically connected 15, through the first transparent conductive portion 15. A test signal is inputted to the TFT associated with the gate layer to which the first transparent conductive portion is electrically connected, and an output signal from the TFT is tested to determine a characteristic of the TFT, e.g., to determine whether the TFT has a fault, or determine a position and/or a cause of a defect in the GOA circuit module.

In an example (not shown), each TFT includes a source and a drain, overlaid with the passivation layer 14. A first transparent conductive portion 15 can be formed on a portion of the passivation layer right above each of the source and the drain. Thus, in order to test a TFT, three first transparent conductive portions 15 can be electrically connected to the gate layer, source and drain of the TFT, respectively, by means of welding (e.g., laser welding). Through the three first transparent conductive portions 15, a test signal and/or control information can be inputted to the TFT to test the characteristic of the TFT. It can be appreciated that the scheme for testing the characteristic of the TFT is not limited to this. For example, the gate layer can be electrically connected to its corresponding first transparent conductive portion only for inputting a control signal and a test signal can be inputted to the source and/or gate of the TFT via a signal line of the GOA circuit for testing the characteristic of the TFT.

As shown in FIG. 1, the GOA circuit module can further include a signal output lead 4 and a first signal line 5. The signal output lead 4 is provided for outputting a gate line driving signal generated by the GOA circuit module to a display area, AA, of the display panel. In the example shown in FIG. 1, the TFT 1-2 can be the TFT at the last stage in the GOA circuit and connected to the signal output lead 4. The signal line 5 can include a source power line and/or a drain power line of the TFT, or a clock signal line of the GOA circuit module. The signal line 5 can be electrically connected to at least one of the TFTs, and intersects with and electrically isolated from the signal output lead 4. While only one signal output lead 4 and one set of signal lines 5 shown in FIG. 1, it can be appreciated that the structure or shift register at each stage of the GOA circuit may correspond to one signal output lead and one set of signal lines, thereby driving the gate on a per line basis.

According to another exemplary embodiment of the present disclosure, the signal line 5 include at least two signal sub-lines, e.g., a first signal line 5-1 and a second signal line 502, which can be parallel to each other. As shown in FIG. 1, the first and second signal lines 5-1 and 5-2 can be electronically connected to a signal input lead, e.g., a lead 8 at the input terminal 1-3, in the GOA circuit module via the vias, or through paths, 6-1 and 6-2, respectively. At least one of the signal sub-line of the signal line 5, e.g., the first signal line 5-1, can be constructed such that it can be cut off so as to be disconnected from both the TFTs 1-1 and 1-2 or other portions in the GOA circuit module and can be electrically connected to the signal output lead 4 by means of welding.

In the example shown in FIG. 1, the GOA circuit module can further include a testing pad 7 electrically connected to the signal line 5 (in particular the signal lines 5-1 and 5-2). The testing pad 7 can be used as desired to input an appropriate test signal to the GOA circuit module, so as to test the characteristics of the GOA circuit module or the TFTs included therein.

In an example, as shown in FIG. 1, the testing pad 7 includes a first portion 7-1 electrically connected to the first signal line 5-1 and a second portion 7-2 electrically connected to the other signal line 5-2. The first portion 7-1 and the second portion 7-2 of the testing pad are separated from each other and electrically connected to each other by a second transparent conductive portion 7-3. That is, the second transparent conductive portion 7-3 overlaps and electrically connects the first portion 7-1 and the second portion 7-2. In an example, the second transparent conductive portion 7-3 may include an ITO layer or made of an ITO material. The second transparent conductive portion 7-3 can be cut off, e.g., by a laser, such that the signal line 5-1 can be disconnected from other signal lines, TFTs and other portions of the GOA circuit module, such that the signal line 5-1 is in an isolated state and does not affect signal inputs to other signal lines.

According to the present disclosure, the signal line 5-1 can be constructed such that it can be electrically connected to the signal output lead 4 in the area 5-4 where it intersects with the signal output lead 4. In this way, a separate signal 5-1 can be used to detect an output signal on the signal output lead 4. For example, the signal line 5-1 and the signal output lead 4 can be connected to each other at the intersection between them.

According to an embodiment of the present disclosure, in order to test the GOA circuit module, one of the signal sub-lines in the signal line 5 (e.g., the first signal line 5-1) can be electrically disconnected from other signal lines, TFTs and other portions of the GOA circuit module. For example, the second transparent conductive portion 7-3 that connects the first portion 7-1 and the second portion 7-2 of the testing pad 7 can be cut off at a gap between these two portions appropriately (e.g., by a laser), so as to electrically disconnect the signal line 5-1 from the other signal lines. Further, the input lead 8 can be electrically disconnected from the signal line 5-1 appropriately, e.g., by cutting off the input lead 8 between the vias, or through paths, 6-1 and 6-2 using a laser. Next, the disconnected signal line 5-1 can be electrically connected to the signal output lead 4 to be tested, by means of e.g., laser welding. Then, a test signal is inputted to the GOA circuit module via another signal sub-line at the testing pad 7 and an output signal from the GOA circuit module is detected on the signal line 5-1 electrically connected to the signal output lead 4.

It is to be noted here that the above first transparent conductive portion 15, the first signal line 5-1, or both, can be provided in the GOA circuit module according to the present disclosure as desired. For example, the first signal line can be provided in the GOA circuit module without the first transparent conductive portion. The first signal line intersects with and electrically isolated from the signal output lead. The first signal line is constructed to be electrically disconnectable from other portions of the GOA circuit module than the signal output lead and electrically connectable to the signal output lead by means of welding in an area where it intersects with the signal output lead, such that the output signal from the GOA circuit module can be detected on the first signal line electrically connected to the signal output lead.

On the other hand, there can be a plurality of vias in the gate insulation layer for exposing the gate layer. Each via is overlaid with a layer of first transparent conductive portion (e.g., an ITO layer). The first transparent conductive portion can be provided while forming the gate outlet structure of the TFT. Further, at least one signal line of the GOA circuit can be divided into two signal sub-lines each having one end connected to the two separate portions of the testing pad, respectively. A second transparent conductive portion overlaps and connects the two separate portions. In this way, when parsing or analyzing a defect of a display panel, the first transparent conductive portion above a via can be connected to the gate insulation layer exposed by the via by means of laser welding, so as to test the characteristics of the respective TFTs in the GOA circuit conveniently. Further, in order to test the output signal from the GOA circuit, the second transparent conductive portion connecting the two separate portions of the testing pad can be cut off using a laser, so as to isolate one of the signal sub-lines. At this time, the signal input to the GOA circuit will be affected. Then, the isolated signal sub-line is connected to the signal output line to be tested. In this way, it is possible to test and detect the output from the GOA circuit from outside of the display panel while using the testing pad to provide an input, without the need to pry a corner of a color filter substrate away. Therefore, the efficiency and success rate for parsing the display panel can be significantly increased and the complexity of the testing procedure can be reduced.

In addition, a display panel is provided. The display panel includes an array substrate having the GOA circuit module according to the above embodiments integrated thereon.

Further, a display apparatus is provided. The display apparatus includes the above display panel. The display apparatus may include an LCD display apparatus, such as an LCD TV, a mobile phone, an e-book, a tablet computer, or the like.

While the embodiments of the present disclosure have been illustrated and described above, various modifications can be made to these embodiments by those skilled in the art without departing from the principle and spirit of the present disclosure. The scope of the present disclosure is defined only by the claims as attached and equivalents thereof.

What is claimed is:

1. A Gate On Array (GOA) circuit module, comprising:
a plurality of Thin Film Transistors (TFTs), each comprising a gate layer and a gate insulation layer laminated on a substrate;
a plurality of vias each provided in the gate insulation layer to expose a portion of the gate layer;
a plurality of first transparent conductive portions each corresponding to one of the plurality of vias, each of the plurality of the first transparent conductive portions being provided at its corresponding via, electrically isolated from the gate layer, and constructed to be electrically connectable to the portion of the gate layer as exposed by its corresponding via by means of welding; and
a signal output lead and a first signal line,
wherein
the first signal line intersects with and electrically isolated from the signal output lead, and
the first signal line is constructed to be electrically disconnectable from other portions of the GOA circuit module than the signal output lead and electrically connectable to the signal output lead by means of welding in an area where it intersects with the signal output lead.

2. The GOA circuit module of claim 1, wherein each of the first transparent conductive portions is made of Indium Tin Oxide (ITO) material.

3. The GOA circuit module of claim 1, further comprising a passivation layer covering locations of the plurality of vias, such that each of the plurality of the first transparent conductive portions is electrically isolated from the gate layer by the passivation layer.

4. The GOA circuit module of claim 3, wherein each of the plurality of TFTs further comprises a source/drain layer arranged between the gate layer and the passivation layer in areas where the plurality of vias are located.

5. The GOA circuit module of claim 1, further comprising a second signal lead connected to a signal input lead of the GOA circuit module.

6. The GOA circuit module of claim 5, further comprising a testing pad having a first portion electrically connected to the first signal line and a second portion electrically connected to the second signal line, the first portion and the second portion being separated from each other.

7. The GOA circuit module of claim 6, wherein the first signal line is further connected to the signal input lead of the GOA circuit module, and the first and second portions of the testing pad are electrically connected to each other by a second transparent conductive portion that can be cut off.

8. The GOA circuit module of claim 7, wherein the second transparent conductive portion is made of ITO material.

9. A display panel, comprising an array substrate having a Gate on Array (GOA) circuit module, wherein the GOA circuit module comprising:
a plurality of Thin Film Transistors (TFTs), each comprising a gate layer and a gate insulation layer laminated on a substrate;
a plurality of vias each provided in the gate insulation layer to expose a portion of the gate layer;
a plurality of first transparent conductive portions each corresponding to one of the plurality of vias, each of the plurality of the first transparent conductive portions being provided at its corresponding via, electrically isolated from the gate layer, and constructed to be electrically connectable to the portion of the gate layer as exposed by its corresponding via by means of welding; and
a signal output lead and a first signal line,
wherein the first signal line intersects with and electrically isolated from the signal output lead, and the first signal line is constructed to be electrically disconnectable from other portions of the GOA circuit module than the signal output lead and electrically connectable to the signal output lead by means of welding in an area where it intersects with the signal output lead.

10. A display apparatus, comprising the display panel comprising an array substrate having a Gate On Array (GOA) circuit module,
wherein the GOA circuit module comprising:
a plurality of Thin Film Transistors (TFTs), each comprising a gate layer and a gate insulation layer laminated on a substrate;
a plurality of vias each provided in the gate insulation layer to expose a portion of the gate layer;
a plurality of first transparent conductive portions each corresponding to one of the plurality of vias, each of the plurality of the first transparent conductive portions being provided at its corresponding via, electrically isolated from the gate layer, and constructed to be electrically connectable to the portion of the gate layer as exposed by its corresponding via by means of welding; and
a signal output lead and a first signal line,
wherein the first signal line intersects with and electrically isolated from the signal output lead, and the first signal line is constructed to be electrically disconnectable from other portions of the GOA circuit module than the signal output lead and electrically connectable to the signal output lead by means of welding in an area where it intersects with the signal output lead.

11. A method for testing a Gate On Array GOA circuit module wherein the GOA circuit module comprising: a plurality of Thin Film Transistors (TFTs), each comprising a gate layer and a gate insulation layer laminated on a substrate; a plurality of vias each provided in the gate insulation layer to expose a portion of the gate layer; and a plurality of first transparent conductive portions each corresponding to one of the plurality of vias, each of the plurality of the first transparent conductive portions being provided at its corresponding via, electrically isolated from the gate layer, and constructed to be electrically connectable to the portion of the gate layer as exposed by its corresponding via by means of welding; and a signal output lead and a first signal line, wherein the first signal line intersects with and electrically isolated from the signal output lead, and the first signal line is constructed to be electrically disconnectable from other portions of the GOA circuit module than the signal output lead and electrically connectable to the signal output lead by means of welding in an area where it intersects with the signal output lead;

the method comprising steps of:

electrically connecting one of the plurality of the first transparent conductive portions to the portion of the gate layer as exposed by its corresponding via;

inputting a gate control signal to the gate layer to which the first transparent conductive portion is electrically connected, through the first transparent conductive portion; and inputting a test signal to the TFT associated with the gate layer to which the first transparent conductive portion is electrically connected, and testing an output signal from the TFT to determine a characteristic of the TFT.

12. The method of claim 11, wherein the first transparent conductive portion is electrically connected to the gate layer by means of laser welding.

13. The method of claim 11, wherein the GOA circuit module comprises a signal output lead and a first signal line, wherein the first signal line intersects with and electrically isolated from the signal output lead, and the first signal line is constructed to be electrically disconnectable from other portions of the GOA circuit module than the signal output lead and electrically connectable to the signal output lead by means of welding in an area where it intersects with the signal output lead, and wherein the method further comprises:

electrically disconnecting the first signal line from the other portions of the GOA circuit module than the signal output lead;

electrically connecting the first signal line to the signal outputting lead; and detecting an output signal from the GOA circuit module on the first signal line.

14. The method of claim 13, wherein the first signal line is electrically disconnected from the other portions of the GOA circuit module than the signal output lead by means of laser cut-off.

15. The method of claim 13, wherein the first signal line is electrically connected to the signal outputting lead by means of laser welding.

16. The GOA circuit module of claim 2, further comprising a signal output lead and a first signal line, wherein the first signal line intersects with and electrically isolated from the signal output lead, and the first signal line is constructed to be electrically disconnectable from other portions of the GOA circuit module than the signal output lead and electrically connectable to the signal output lead by means of welding in an area where it intersects with the signal output lead.

17. The GOA circuit module of claim 4, further comprising a signal output lead and a first signal line, wherein the first signal line intersects with and electrically isolated from the signal output lead, and the first signal line is constructed to be electrically disconnectable from other portions of the GOA circuit module than the signal output lead and electrically connectable to the signal output lead by means of welding in an area where it intersects with the signal output lead.

\* \* \* \* \*